United States Patent [19]

Lerner et al.

[11] 4,061,521

[45] Dec. 6, 1977

[54] METHOD AND APPARATUS FOR MANUFACTURE OF SWATCH BEARING SHEETS

[75] Inventors: Stanley Lerner, Highland Park; Robert Shearer, Park Ridge, both of Ill.

[73] Assignee: Color Communications, Inc., Melrose Park, Ill.

[21] Appl. No.: 706,433

[22] Filed: July 19, 1976

[51] Int. Cl.$^2$ .............................................. B32B 31/00
[52] U.S. Cl. ................................... 156/265; 156/521; 156/561
[58] Field of Search ................. 156/63, 521, 560, 561, 156/264, 265

[56] References Cited

U.S. PATENT DOCUMENTS

| | | | |
|---|---|---|---|
| 1,126,003 | 1/1915 | Graul | 156/561 |
| 2,183,797 | 12/1939 | Smith | 156/82 |
| 2,362,328 | 11/1944 | Von Hoff | 156/350 |
| 3,630,124 | 12/1971 | Souermon | 93/61 A |
| 3,707,422 | 12/1972 | Helm | 156/521 |
| 3,887,414 | 3/1975 | Cohn | 156/108 |

Primary Examiner—Douglas J. Drummond
Attorney, Agent, or Firm—Fitch, Even, Tabin & Luedeka

[57] ABSTRACT

A method and apparatus are disclosed for the manufacture of a colored chip or colored swatch bearing sheet, i.e. a color chart, comprising a base sheet bearing an array of adhesively attached colored chips in rows with indicia identifying the color of each chip with a particular paint. The base sheets are fed automatically from a stack of sheets to an adhesive applying means which applies spots of adhesive to the sheet at swatch receiving areas on the sheet. Narrow webs or ribbons of swatch material are severed to form the individual swatches or color chips which then are transferred automatically to a passing sheet and applied thereto. The sheets pass through a series of swatch forming and applying stations with a row of swatches being applied to each sheet at each of the respective stations. Preferably, the sheets are fed continuously and at a relativey fast rate of speed. The arrangement and size of the swatches may be easily changed to allow the apparatus to be used for various types of color charts.

18 Claims, 27 Drawing Figures

METHOD AND APPARATUS FOR MANUFACTURE OF SWATCH BEARING SHEETS

This invention relates to a method and apparatus for producing chip or swatch bearing sheets having an array of colored chips or swatches as on a color chart.

The present invention is particularly directed to the formation of so-called color chart sheets which bear several rows of chips of swatches each of a different color and each identified so that one may order a particular paint or color after making a visual selection from the array of colored swatches on the card. The manufacturer of such color charts is faced with the varied requirements of arranging different widths and spacing between swatches not only on the same sheet or card; but also when switching from one customer to another customer who prefer different numbers, sizes and locations for their swatches. From an economic standpoint, it is important that the cards are manufactured quickly and at high rates of speed with a minimum of manual labor.

At this time, a commercial process to form such color charts includes the step of coating sheets of paper with each of the desired colors and then severing each of the sheets with a cutter apparatus into narrow strips having the width of the swatches. A series of narrow strips are then stacked side by side on the tray with the adjacent stacks of strips having different colors. These stacks of strips are then fed to another cutter which cuts strips to form the individual swatches to the desired length. These small stacks of swatches are then manually loaded into the proper bins or holes in a till box which is in the form of a grid of bins each containing a stack of swatches. The bin locations conform to the locations desired for the swatches when adhered to the card. The till box has several wires which support the lowermost swatch of each stack. A different till box is usually made for each pattern of swatches for each card. The till box is then taken to an automatic feeding and applying machine which has a bottom head with a grid-like arrangement of vacuum cups on its upper surface corresponding to the grid-like pattern of swatches in a till box. The bottom head is shifted upwardly to position at which each of the vacuum cups grips the lowermost swatch in each till box bin and then the head moves downwardly with each vacuum cup picking a swatch from the till box. The bottom head is then translated to a position beneath a top head which has a series of downwardly projecting vacuum cups in the same array. The vacuum is broken on the bottom head while applied at the top head so that top surfaces of the swatches are held by the top head, this allowing the bottom head to be returned for the next swatch removing operation. The top head carries the swatches past an adhesive coated roller which applies an adhesive coat to the underside of the swatches. The top head then translates to a position over a sheet or a card and the card is pressed against the under surfaces of the swatches as the vacuum is being released so that the swatches will remain on the card. The card with the swatches is then passed through nip rollers which press the swatches to the card. Usually the card is then folded and sent to a packing machine.

The formation of the swatches and stacking of the till box and the use of a different and separate till box for each array of swatches results in a relatively slow and costly method. Also, the reciprocating movement of the respective bottom and top heads of the intermittent motions to transfer the swatches from the till box in between the heads and onto the card results in a relatively slow process.

Other arrangements have been suggested although they have not apparently been commercially successful, at least on a wide scale, in which ribbons of swatch-bearing material have been formed and subsequently cut to form individual swatches such as shown in U.S. Patent 2,183,797.

Accordingly, a general object of the present invention is to provide a new and improved method, as contrasted to the prior art method and apparatus, for the manufacture of swatch or chip bearing sheets or cards.

Other objects and advantages of the invention will become apparent from the following detailed description taken in connection with the accompanying drawings in which:

FIG. 5 is a diagrammatic illustration of a replaceable sheet having adhesive applicator pads thereon for use with the drum shown in FIG. 4a;

FIG. 6 is an enlarged sectional view taken substantially along line 6—6 of FIG. 5;

FIG. 7 is a fragmentary and partially sectional view of an adhesive applying station;

FIG. 23 is a side elevational view of the opposite side of the apparatus shown in FIG. 1; and FIG. 24 is a sectional view of a drum adjusting mechanism.

As shown in the drawings for purposes of illustration, the invention is embodied in a method and apparatus for forming a chip or swatch bearing sheet or color chart 10 comprising a base sheet or card 11 bearing an array of individually colored chips or swatches 12 of various sizes and chips spaced transversely of one another at predetermined transverse spaces 14 and spaced from an adjacent row of swatches 12 by longitudinal spaces 15 on the card 11. Herein, the illustrated color chart 10 is illustrated with six rows of swatches each having nine swatches 12 across the card and each swatch is disposed adjacent preprinted indicia identifying the color of its associated swatch, each of the swatches being of a different color. The illustrated sheet 11 is a paperboard sheet which is heavier than the usual paper although paper may also be used for the sheet 11. The transverse width of the swatches may vary significantly within a row or from row to row, as indicated by dotted lines for swatches shown on the sheet 11 in FIG. 9.

In the above-described commercial prior art process, stacks of sheets were severed into stacks of swatches and then the swatch stacks were manually loaded into the till boxes which was a slow, time consuming and expensive operation. The use of a reciprocating vacuum head having a vacuum cup for each swatch location was again a slow operation as was the stationary transfer of the swatches to the upper head which carried the swatches laterally across an adhesive roller which coated the underside of the swatches. The top head then shifted over a stationary sheet at the time of swatch applying which again was a slow operation. Thus, this manner of swatch formation and transfer from the bins and through the adhesive to the stationary card is a relatively slow and expensive process as compared to the present invention.

Figure 9:
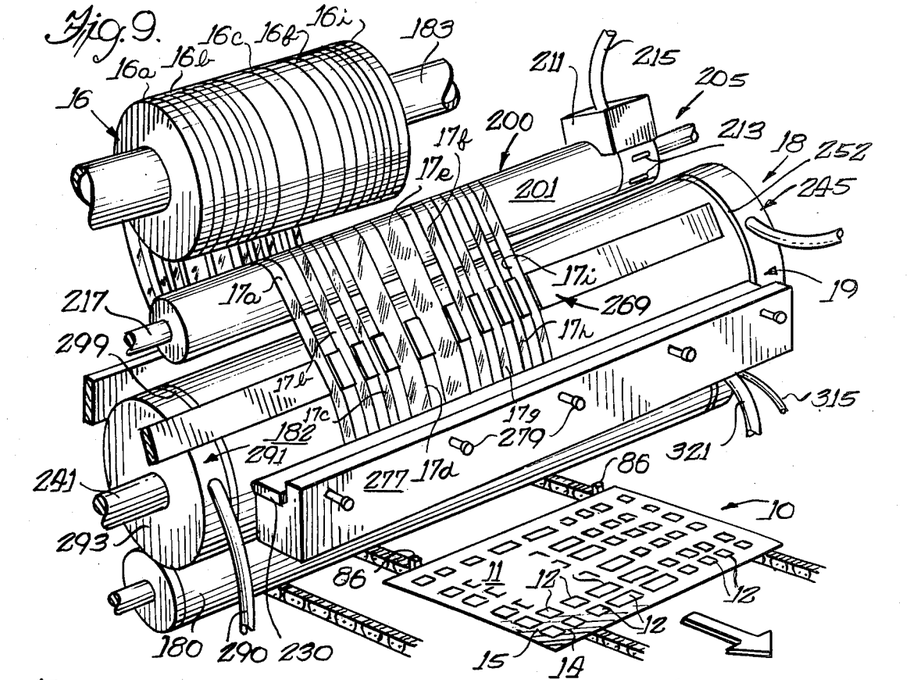
FIG. 9 is a fragmentary perspective view of the swatch forming and applying station of FIG. 8.

In accordance with the present invention, a swatch-bearing chart 10 is formed in a high speed and preferably continuous manner without a till box or the reciprocating heads for transferring the swatches from the till box to the card 11. In the preferred method, at least one row of the swatches 12 is severed from a set of printed webs of ribbons, e.g., 17a–17i, each mounted on a roll on a reel 16a–16i, as best seen in FIG. 9, with the individual webs 17a–17i being unwound and fed forwardly at swatch forming and applying stations 18 at which predetermined lengths of the ribbons are severed by a severing means 19 to form a row having individual swatches 12 which are then transferred and applied to a sheet 11 passing thereby.

Figure 1:
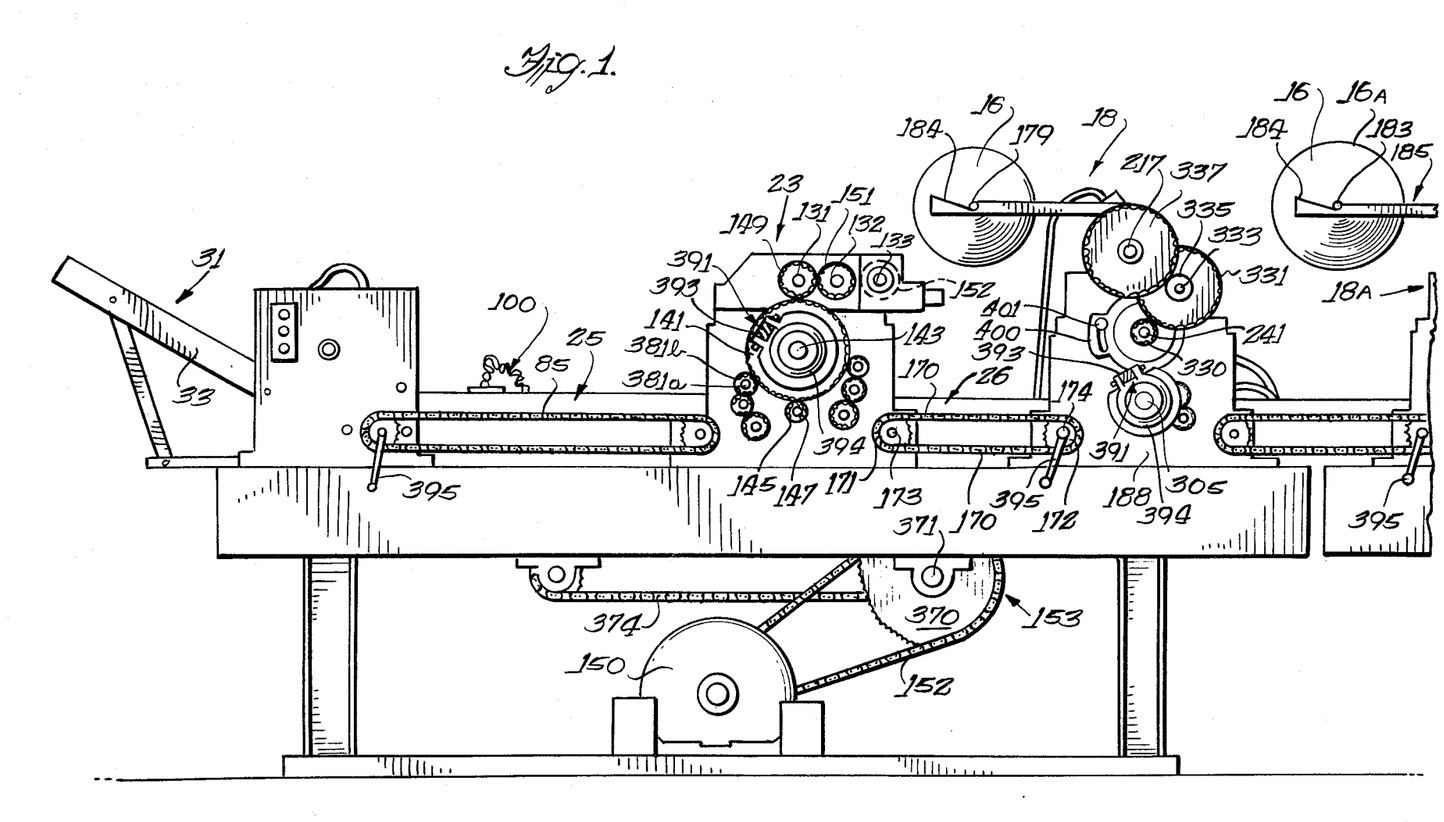
FIG. 1 is a side elevational view illustrating an apparatus for carrying out a method and embodying novel features of the invention.

In accordance with the invention, the individual swatches 12 are each transferred by a moving transfer means 20 onto an adhesive or glue spot which previously has been applied to the continuously moving sheet 11 at each of the swatch receiving locations at an adhesive applying station 23. Therefore, when the swatches are pressed onto these adhesive areas, the swatches adhere to and are affixed to the sheet. The preferred process is a continuous one in which the sheets 11 are fed forwardly with an uninterrupted movement by a first conveyor means 25 to and through the adhesive applying station 23 and then fed forwardly in timed relationship to and through each of a plurality of swatch forming and applying stations 18, 18a, etc., at each of which a transfer means 20 transfers a row of swatches to a row of adhesive areas on the sheet. In FIG. 1, only the station 18 is shown in detail and a second station 18A is shown partially; but it is to be understood that a plurality of identical swatch-forming and applying stations for each row are provided downstream with each applying a row of swatches to the sheet until each of the desired number of rows are applied to the sheet such as the six rows shown in FIG. 8.

Thus, it will be seen that with the present invention a sheet may continuously feed forwardly at a high rate of speed through the adhesive applying station 23 an also through a series of swatch forming and applying stations 18, 18A, etc. each of which applies a row of swatches to the continuously traveling sheet. Furthermore, the apparatus may be quickly converted to handle different sizes and shapes of sheets and of swatches so that various swatch cards 11 may be made with the present apparatus, as will be explained in greater detail, in contrast to the more difficult formation of different till boxes for the aforementioned prior art process.

Figure 2:
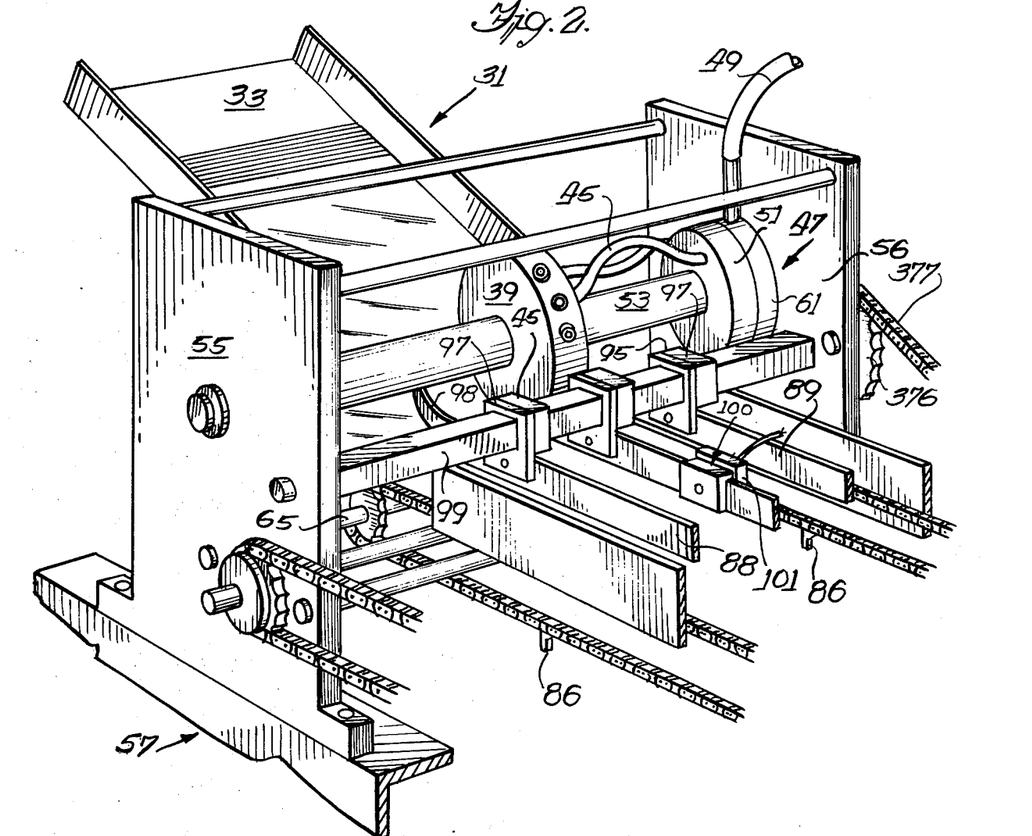
FIG. 2 is a partial perspective view of a means for holding a stack of sheets and for feeding a sheet forwardly from the stack.
Figure 3:
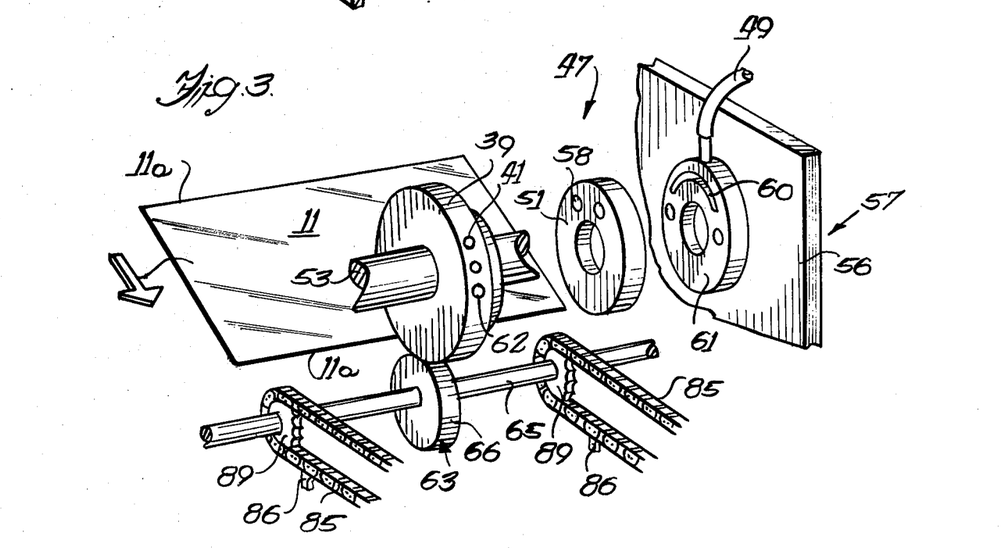
FIG. 3 is a partially diagrammatic view of a pick-off roller for automatically removing a sheet from a stack.
Figure 4:
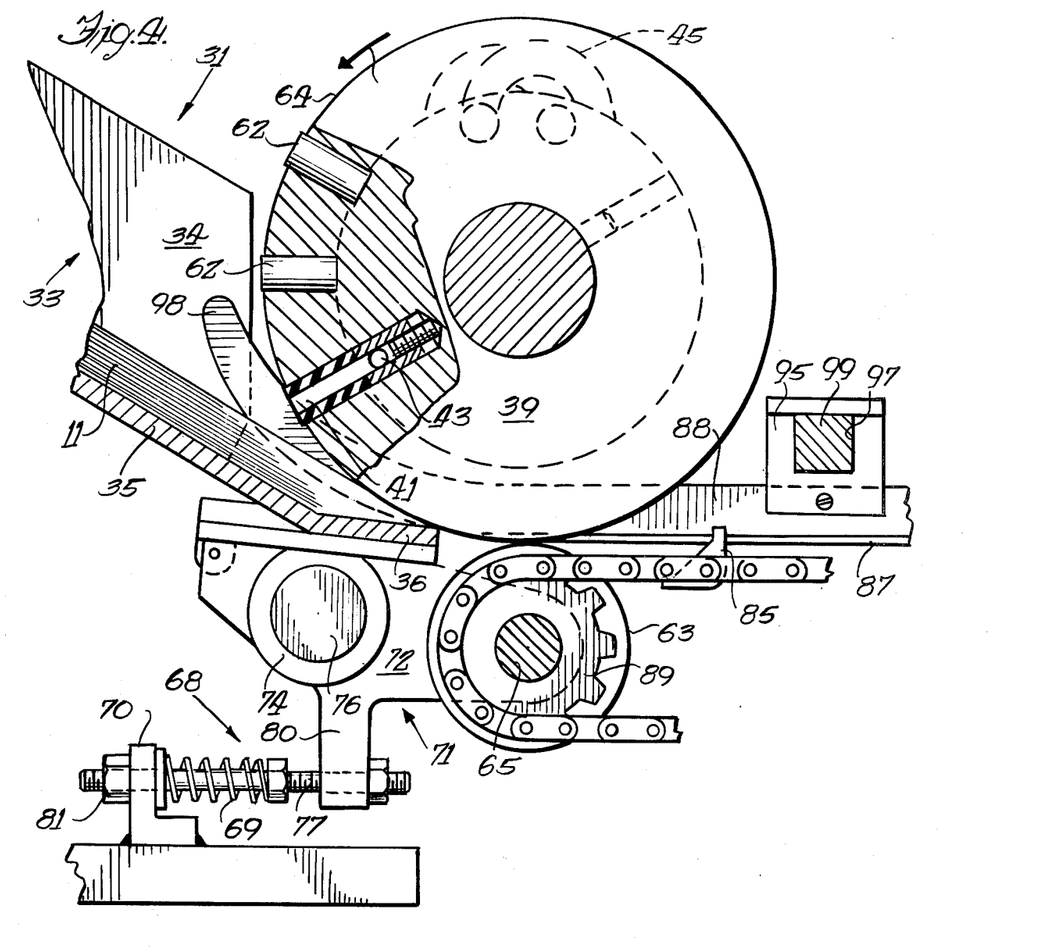
FIG. 4 is a partially sectioned fragmentary view of a pick-off roller for picking off a sheet from a stack.

Referring now in greater detail to individual elements of the invention, the sheets 11 are automatically fed at a high rate, e.g., 100 or more sheets a minute, from a sheet-holding or hopper means 31 (FIGS. 1–4) in the form of an inclined tray 33 having a stack of sheets 11 therein arranged in a shingle-like fashion with their lower forward edges 11a being separated and with top sheet 11 being fed from the stack. The tray 33 comprises a pair of upstanding side walls 34 joined to a downwardly inclined base plate 35 which, as best seen in FIG. 4, leads to another inclined guide plate section 36 extending to a position closely adjacent the periphery of a rotating suction feed means 37 in the form of a rotating suction or feed roller 39. In the present invention, each rotation of the feed roller 39 is intended to feed one card 11 forwardly to the adhesive applying station 23 with each rotation of the feed roller 39. As best seen in FIGS. 2, 3 and 4, the illustrated feed roller 39 is provided along its periphery with at least one radially extending suction port 41 extending to the peripheral surface of the feed roller. The suction port 41 is connected to a cross bore 43 (FIG. 4) in the suction roller and this bore 43 is connected to one end of a suction hose 45 (FIG. 2) which extends to a rotary valve means 47 (FIGS. 2 and 3) which, in turn, is connected to a suction pipe 49.

The rotary valve means 47 includes a rotating valve disk 51, as best seen in FIG. 3, affixed to a central support feed roller shaft 43 journaled for rotation in upstanding side plates 55 and 56 of a frame means 57 for the apparatus. The rotating valve disk 51 has at least one transverse bore 58 therein which, when aligned with a portion of an arcuate slot 60 in a stationary valve disk 61 secured to side plate 56, allows negative pressure, i.e., suction, to be connected through an upwardly directed bore in the valve disk 61 and through the suction pipe 49. Thus, the valve means 47 functions for a predetermined arucate movement of the feed wheel 39, as the suction port 41 is approaching and contacting the underlying top sheet 11 in the tray 33 to apply suction through the suction port 41 to grip the sheet and pull it forwardly from the tray.

To assist the suction pull of the feed roller 39, it may also be provided with a pair of radially extending compressible, resilient plugs 62 (FIG. 4) which project outwardly of the peripheral surface 64 of the roller 39 to engage the sheet and to press the same into contact with an underlying pressure roller 63. The underlying pressure roller 63 is constantly driven by and secured to a rotating shaft 65 which also drives the first conveyor means 25, as will be explained in greater detail hereinafter. The peripheral wall 66 of the underlying feed roller 63 is biased toward engagement with the peripheral surface 64 of the suction feed roller to establish a nip to assure a positive feed nip for the sheet fed thereto by the suction port 41.

As best seen in FIG. 4, the underlying pressure roller 63 is biased into engagement with the suction roller 39 with a predetermined biasing force as determined by a biasing means 68 in the form of coil spring 69 which acts between a stationary bracket 70 on the frame means 57 and a bellcrank lever 71 having an apertured arm 72 through which projects the shaft 65. Herein, the bellcrank is mounted by a bearing 74 to turn on a stationary shaft means 76. The coil spring 69 is telescoped onto a threaded bolt 77 and has one end abutting the upstanding fixed bracket 70 and the other end abutting a nut 79 threaded onto the shaft 77. The spring 69 pushes the bolt 77 to the right, as viewed in FIG. 4, and, as the right-hand end of the bolt is threaded into bellcarnk arm 80, the bellcrank 71 is urged to turn in a counterclockwise direction as seen in FIG. 4. Another nut 81 on the left of the bolt 77 abuts the bracket 70 and limits the travel of the bolt through a bore in the bracket.

Figure 7A:
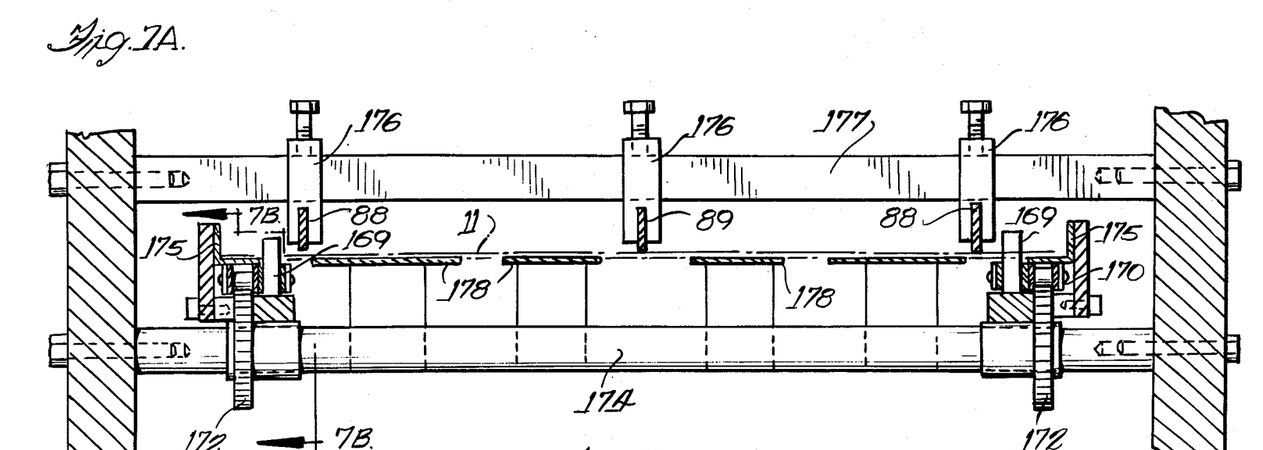
FIG. 7A illustrates a portion of a sheet conveyor means.
Figure 7B:
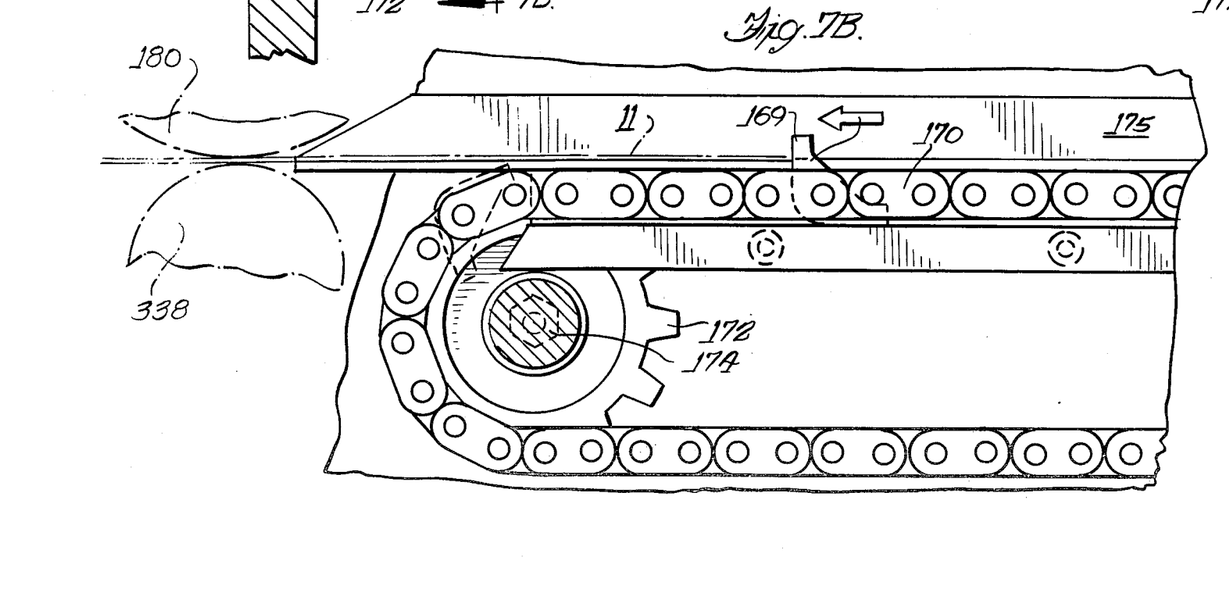
FIG. 7B is a cross-sectional view of the conveyor means taken along line 7B—7B of FIG. 7A.

Automatically, and with each rotation of the suction feed roller 39, one sheet 11 is fed forwardly, e.g., 100 sheets per minute when the feed roller 39 rotates at 100 rpm, at spaced and uniformly timed intervals to the first conveyor means 25 which engages and carries each sheet forwardly to the adhesive station 23. Herein, the first conveyor means 25 comprises a pair of endless bands in the form of chains 85 each carrying two outwardly projecting feed fingers 86 which on their upwardly forward run project upwardly of the chains 40 and abut the rearward edge 11b of the sheet 11 to push the same forwardly along stationary plates 87, FIG. 4, and between side edge guides (similar to side edge guides 175 shown in FIGS. 7A and 7B) which maintain the parallelism of the sheet as it is pushed forwardly to the adhesive applying station 23.

Figures 5, 6, 7:
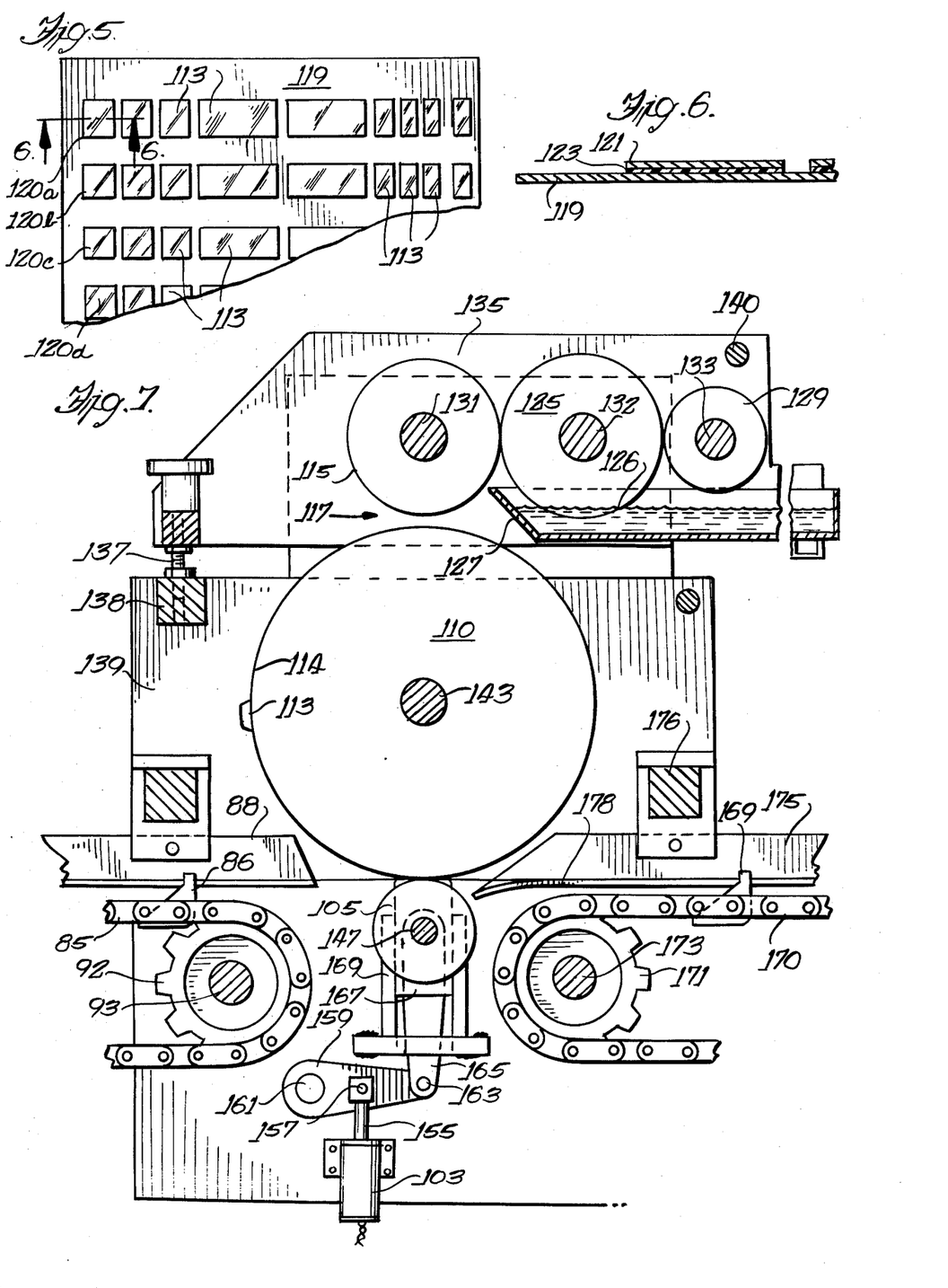

The endless chains 85 carrying the feed fingers 86 are each entrained about a rearward sprocket 89 fastened to the shaft 65. At their forward ends, the chains 85, as shown in FIG. 7, are entrained about forward sprockets 92 mounted on a shaft 93 rotatably mounted in the frame means 57. The details of the construction of the conveyor means 25 will become more clear with the description of the similar second conveyor means 27, hereinafter.

Sheet hold-down guides 88 and 89 also extend into the hopper means 31 and to the adhesive applying means 23 to assist in maintaining the parallelism of the succession of sheets being conveyed by the first conveyor means. The hold-down guides 88 and 89 are mounted at their forward ends by slidable brackets 95 each of which has a hollow square-shaped aperture 97, as best seen in FIG. 4, for receiving a square cross-sectioned bar 99 which spans and is fastened to respective side frame plates 55 and 56. The illustrated hold-down guides 88 and 89 may be shifted along the bar toward or from each other to accommodate different widths of sheets. Herein, hold-down guides have arcuate upturned ends 98 which extend into the feed tray 33 to assure the sheets 11 are aligned in the tray 33 and remain aligned as they are fed forwardly onto the first conveyor means 25.

In the event that the suction feed roller 39 fails to feed a sheet 11 forwardly to the conveyor, it is preferred to sense the lack of the sheet by means of a detecting or sensing means 100 or in the form of optical or light sensing photocell means 101 which, if it is not interrupted by the sheet within a predetermined time period of a revolution of the suction feed roller 39, disables the adhesive applying means, as will be described. In the absence of the sheet 11, the photocell means actuates a solenoid 103 (FIG. 7) to pull downwardly to an inoperative position an adhesive pressure roller 105 so that adhesive is not applied to the roller 105 and hence later applied to the underside of the sheet 11 passing through the adhesive applying station 23.

At the adhesive applying station 23, adhesive is applied to a continuously moving sheet 11 and preferably to each swatch receiving location or area on the sheet by an adhesive applying means. Also, as will be explained, the location of the adhesive spots can be easily varied to accommodate various swatch arrays and sheets 11. Alternatively, an adhesive applying station may be provided immediately before each of the swatch forming and applying stations 18a–18e to apply one row of adhesive spots. Herein, the adhesive applying drum 110 carries a plurality of glue or adhesive applying pads 113 on its outer surface 114 with the pads projecting radially outwardly on the drum surface so that only the pads 113 contact an adhesive-applying roller 115 with the remainder of the drum surface being spaced from the adhesive-applying roller by a spacing 117, as shown in FIG. 7.

Figure 4A:
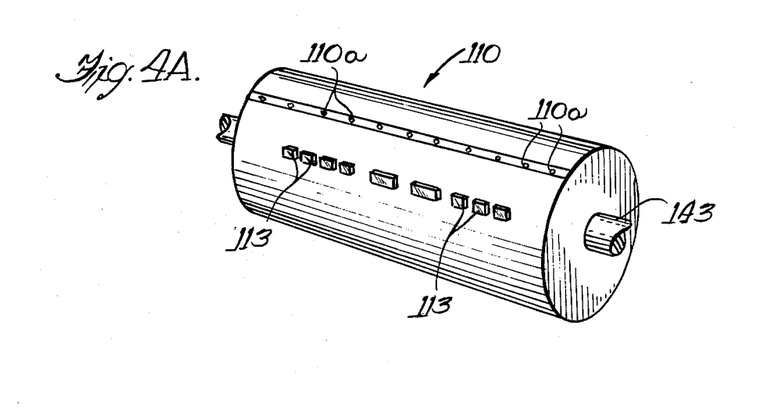
FIG. 4a is a reduced size, perspective view of a rotatable adhesive applicator drum.

To allow the apparatus to be used for various types of locations of the adhesive areas, the glue pads 113 are preferably carried on a removable and replaceable pad carrier or sheet 119, FIGS. 5 and 6, of a plastic sheet, such as Mylar or the like, which is fastened about the circumference of the drum 110 by fasteners 110a (FIG. 4A). As best seen in FIG. 5, a plurality of rows 120a–120d of pads 113 of the same general size as the swatches 12 and with the same transverse spacing therebetween, as between the swatches, are mounted on the carrier 119 and serve to apply an array or field of glue spots to the sheet 11 at the locations at which the swatches are to be adhered. The preferred pads 113 have outer glue receiving layer 121 and a pressure sensitive adhesive backing layer 123 which allows the pads to be readily located on and attached to carrier 119.

Herein, the adhesive may be carefully metered by a three-roll applicator system which includes an adhesive pick-up roller 125 which has its lower periphery rotatably immersed in an adhesive or glue 126 in a tray-shaped glue tank or reservoir 127. A metering roller 129 squeegees and meters the amount of glue transferred from the pick-up roller and fed to the applicator roller 115. It is preferred to mount each of the rollers 115, 125 and 129 for contacting each other and for rotation on shafts 131, 132 and 133 carried by a pair of side frame plates 135.

The adhesive mechanism can be readily raised or lowered by turning screws 137 in threaded blocks 138 carried by stationary blocks 139 to pivot the side plates 135 at their other ends about a pivot shaft 140. Thus, the adhesive roller 115 may be pivoted upwardly to prevent gluing when it is desired to perform other maintenance or other functions without applying glue.

The adhesive-applying drum 110 and the applicator roller 115 which applies the adhesive to the pads 113 on the drum 110 are preferably continuously rotated at a predetermined speed to have the pads 113 contact the underlying sheet 11 at the linear speed that the sheet has been traveling on the first conveyor means 25 and through the nip between the drum 110 and the roller 105. Also, the pads 113 and the underlying pressure applying roller 105, which also is power driven, define a feed nip to continue to move the sheet forwardly through the adhesive applying station 23 to the second conveyor means 27. To drive the drum 110, the underlying pressure roller 105 and glue rollers 115, 125 and 129 in timed relationship to each other, a large timing gear 141 (FIG. 1) is fixed to the end of the drum support shaft 143 and this gear 141, in turn, is meshed with and drives a gear 145 fixed to a shaft 147 carrying the underlying pressure roller 105. The adhesive applicator roller 20 support shaft 131 carries a gear 149 which is meshed with the drum timing gear 141 and is driven thereby. A gear 151 fixed to the pickup roller shaft 132 is meshed with the gear 149 and is driven thereby. The opposite end of the pickup roller shaft also has a gear affixed thereto which drives a gear 152A fixed to the metering roller support shaft 133. Thus, all of the adhesive rollers and the underlying pressure roller are driven by and in timed relationship to the drum gear 141. The power drive for the drum 110 and all of the moving apparatus comes from a motor 150 (FIG. 1) which drives a chain 152 driving a large gear mechanism 153 which in turn drives a chain leading a gear mounted on the opposite side of the drum 110 from the side shown in FIG. 1.

As described hereinbefore, in the event a sheet 11 has not been fed forwardly by the first conveyor means 25, the adhesive applying pads 113 would coat the underlying pressure roller 105 which would subsequently apply adhesive to the underside of the sheet 11. When the photocell means 101 detects a lack of a sheet 11, it energizes the circuit of the solenoid 103 which has its plunger 155 connected by a pin 157 to a lever arm 159 mounted for rotation on the shaft 161. The lever 159 has a pin connection 163 to an upstanding link 165 connected to rollers supporting shaft 147. The shaft 147 is supported at its opposite ends in a side means comprising a pair of vertically reciprocable slide blocks 167 mounted in stationary slide guides 169. Thus, movement of the solenoid plunger 155 downwardly pulls the link 165, shaft 147, and slide blocks 167 downwardly to lower the roller 105 beneath the path of the pads 113.

From the adhesive applying station 123, the second conveyor means 27, which is generally similar to the first conveyor means 25, feeds the cards bearing the adhesive spots thereon to the switch forming and applying station 18. More specifically, as shown in FIGS. 1 and 7, 7A and 7B, the second conveyor means 27 includes a pair of upstanding feed fingers 169 attached to a pair of endless bands in the form of chains 170, each spanning sprockets 171 and 172 fixed to rearward and forward horizontally disposed shafts 173 and 174.

Side edge guides 175 and hold down guide bars 88 and 89 extend between the adhesive applying station 23 and the swatch forming and applying station 18 to maintain the parallelism of the sheet 11 as it transfers to the latter. The hold down guide bars 88 and 89 are similar to the above described hold down guide bars for the first conveyor means 25 and they include apertured hanger brackets 176 slidable along transversely extending square bars 177 in the manner of the front edge guides for the first conveyor means, as previously described. The sheet slides along bottom plates 178, as best seen in FIGS. 7, 7A, 7B and 10, to and beneath the swatch transfer means 20 which transfers swatches to the adhesive areas on the upwardly facing side of the sheet 11.

In contrast to the prior art method of having stacks of individual swatches in a till box, each of the colored swatches 12 is severed from one of the ribbons 17a-17i by the severing means 19 at the time a sheet is moving into position to receive a row of swatches. More specifically, an entire row of swatches 12 are severed from the ribbons 17a-17i and are transferred to the continuously moving sheet 11 as it travels beneath the transfer means 20 which includes a transfer roller 180 which receives the individual swatches from a severing drum 182, as will be explained in greater detail.

As best seen in FIGS. 1 and 9, a plurality of reels 16 are mounted to turn loosely on a horizontally disposed support spindle 183 having narrowed ends received in upwardly opened slots 184 carried by a support bracket means 185 of the stationary frame means 57. The reels are separated by spacers along the spindle 183 to conform to the transverse spaces 14 between individual swatches on the sheet 11, as shown in FIG. 9. From each of the reels, each web 17a-17i is fed forwardly to the underside of a rotatable, free wheeling roller 186 (FIG. 8) journaled to rotate about a shaft 187 journaled in upstanding side frame plates 188 and a pivoted dancer or tension roller 189 also engages the upper side of each ribbon. The tension roller 189 rotates about a central shaft 190 fixed at its opposite ends to a pair of depending arms 191 which are pivotally mounted at their upper ends to pins 192 fixed to side plates 188. The tension roller applies tension to the ribbons until a cam pad 193 on the drum 182 rotates to abut the tension roller and pivot it upwardly in a clockwise direction allowing the webs 17a-17i to go slack momentarily.

From the tension roller 189, the ribbons travel past another guide roller 195 rotatably mounted on a stationary shaft 196 fixed to the opposite side plates 188 and then past a vertical surface on a vertically extending side edge, guide plate 197 spanning the side plates 188 to reach a vacuum feed roll means 200 which exerts a pull on the ribbons to unwind the same from their respective reels 16a-16i. The guide plate 197 has a plurality of slots therein defined by a pair of parallel side walls 197a and a bottom wall 197 therebetween and this plate's construction is similar to guide plate 269, described in greater detail hereinafter.

The vacuum feed means 200 selectively applies suction to its rotatable suction feed roller 201 (FIGS. 8 and 9) to unwind predetermined lengths of swatch material from the reels for each rotation of the severing, and vacuum feed drum means comprising a drum 182. To this end, the vacuum feed roller 201 is provided with an air valve means 205 which cooperates with a plurality of longitudinally extending slots 209 (FIGS. 8 and 16) which extend the length of the roller 201 and are spaced circumferentially about the roller 201. The vacuum valve means 205 includes a suction manifold 211 disposed over the top of one end of the vacuum roller 201 and communicates with certain ones of a series of circumferentially spaced ports 213 on the end of the roller 201 as each port is turned into alignment with the manifold 211 which is connected to a suction pipe 215. More specifically, the vacuum feed roller 201 is mounted on a continuously turning shaft 217 which turns each of ports 213 to a position beneath the manifold 211 which is in the form of a housing 219 having an arcuate groove 221 (FIG. 17) overlying several of the ports 213. Thus, a vacuum will be applied to several slots 213 simultaneously. Herein, the housing 211 has a bottom arcuate wall 223 closely adjacent and in a generally sealed relationship to the upper circumferential portion of the roller 201. Suitable plugs or pieces of tape are selectively applied to cover those ports 213 which are not desired to cause any ribbon feeding.

The ribbons or webs 17a–17i are fed with their colored sides facing outwardly of the surfaces of the feed roller 201 and the rotary drum 182 so as not to be scratched thereby.

To allow for an easy change of spacing of the number or width of the swatch material webs, the outer surface of the vacuum feed roller 201 comprises a removable and replaceable sheet 225, such as a plastic Mylar sheet, having circumferentially extending rows of pinholes 227 (FIG. 16) therein aligned with each of the ribbons. The pin holes 227 are also aligned over longitudinal slots 209 in the roller 201 to allow the negative suction pressure to act to grip the ribbons when suction is being applied to an underlying slot 209 through the control of the valve means 205. By the appropriate valve selection, the webs 17a–17i thus are fed and pulled and unwound from the reels 16 in timed relationship to the severing operation as will be described below.

The severing means 19 comprises a stationary or anvil cutting blade 230 which cooperates with a moving cutting blade 231 carried by the drum 182 to sever each of the ribbons 17a–17i simultaneously for the length of the ribbon extending downwardly of the anvil blade 230 and on severing drum 182 at the time rotating blade 231 reaches the anvil blade. Herein, the rotating severing blade 231 is in the form of a bar mounted in a groove 233 in the drum 182 and the blade 231 secured thereto by suitable bolts 235 (FIG. 8) with a pointed cutting edge 235 on the blade adapted to have a severing action as it passes pointed cutting edge 239 of the anvil cutting blade 230. The drum 182 is secured to and rotated by a horizontally extending shaft 241 journaled for rotation in the upstanding frame plates 188, as best seen in FIG. 1.

The drum 182 is also a vacuum drum means for carrying predetermined lengths of the webs 17a–17i past the stationary anvil blade 230 after which the severing blade 233 arrives at the anvil blade to sever the predetermined lengths of swatches with the vacuum in the drum 182 holding the swatches 12 and carrying them to the vacuum transfer roller 180. The ends of the ribbons extending upwardly of the anvil blade will slide over the rotating drum surface until a vacuum control valve means 245 allows suction pressure to hold the ribbons to the drum and to feed the ribbons forwardly a short distance to allow the next row of swatches to be cut as the knife blade 233 again comes past the stationary anvil blade 231. Herein, the painted sides of the web face outwardly of the drum 182 and hence will not be scratched by relative sliding between the webs and the drum surface.

Figure 10:
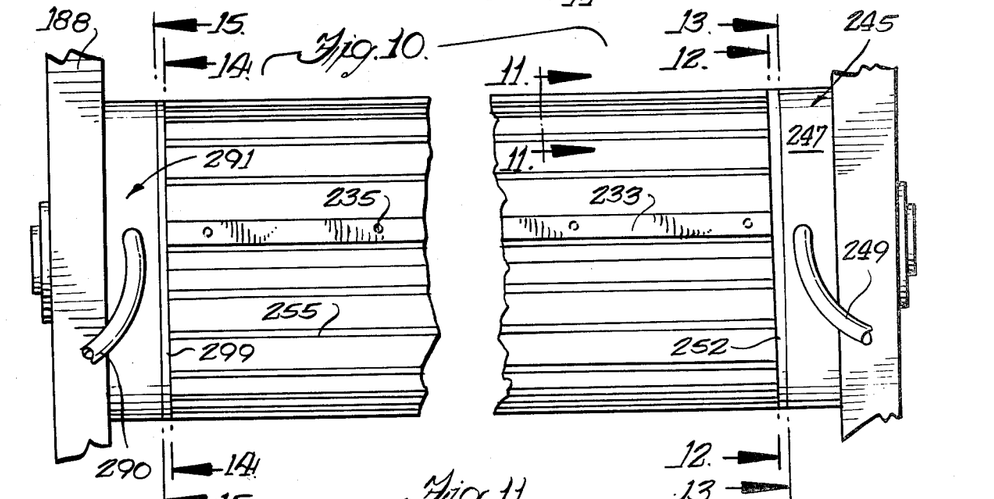
FIG. 10 is a front elevational view, broken in section, of a vacuum feeding and severing drum.
Figure 11:
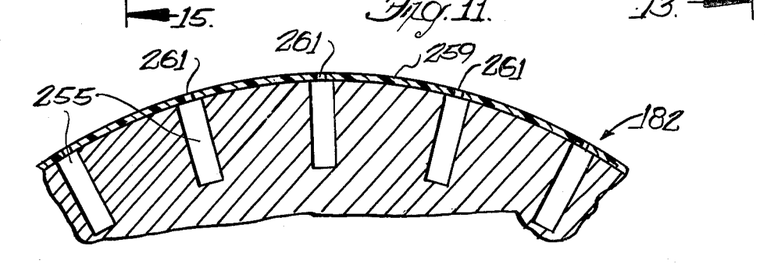
FIG. 11 is an enlarged sectional view taken substantially along the line 11—11 of FIG. 10.

Herein, the vacuum valve means 245, as best seen in FIG. 10, comprises a stationary valve disk 247 to which is connected one end of a suction hose 249. The suction hose 249 is connected through a port in the stationary disk 247 to an elongated internal arcuate groove 251 (FIG. 13) which is in face-to-face contact with a thin rotating valve disk 252 (FIG. 12) having an angular array of radially extending apertures 253 which are aligned with some of the longitudinally extending suction slots 255 (FIGS. 8, 10 and 11) in the drum 182. Herein, the rotating disk 252 is affixed to the end of the drum 182 to rotate therewith.

Figures 12, 13:
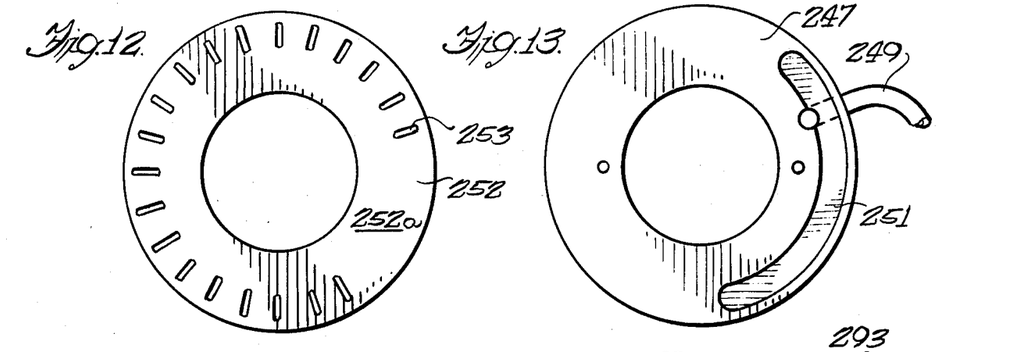
FIG. 12 is a view taken substantially along the line 12—12 of FIG. 10.
FIG. 13 is a view taken substantially along the line 13—13 of FIG. 10.

As can be seen from the position of the groove 251 in FIG. 13, the valve means 245 applies suction along the downward turning side of the drum from adjacent the top of the drum 182 arcuately down to adjacent the bottom of the drum or through approximately 160° so long as slots 253 in the rotating disk 255 are aligned with the groove 251 in the disk 247. Suction pressure is blocked by the unapertured portion 252a (FIG. 12) of the rotating valve disk 252 for about one-fourth of the drum's circumference. Also, the upward turning side of the drum is not in fluid communication with the groove 251 in the stationary valve disk.

Figure 18:
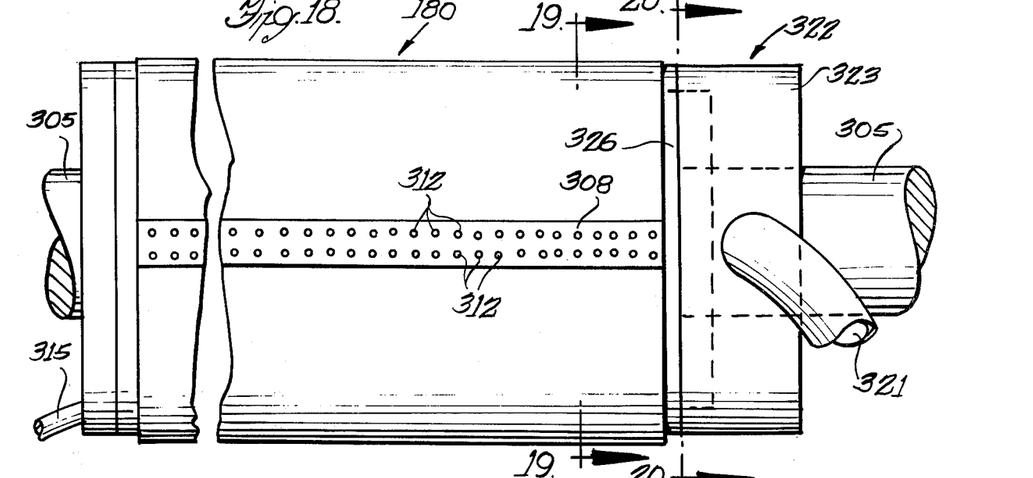
FIG. 18 is a sectional and fragmentary view of a vacuum transfer drum.

To provide versatility in formation of various widths and spacings between swatches as well as to provide a quick change to accommodate swatches of various sizes and shapes, it is preferred that the suction be applied from the grooves 255 through a removable and replaceable sheet 259 having pin holes 261 (FIG. 11) located in rows about the sheet with the pin holes being aligned with longitudinally extending slots 255 in the drum 182. Thus, the location of the suction in the transverse direction across the drum 182 is determined by the locations or holes 261 formed in sheet 259. The latter is preferably a Mylar sheet fastened about the drum with its opposite ends, as best seen in FIG. 18, fastened to the drum by rows of fasteners.

Figures 19, 20, 21, 22:
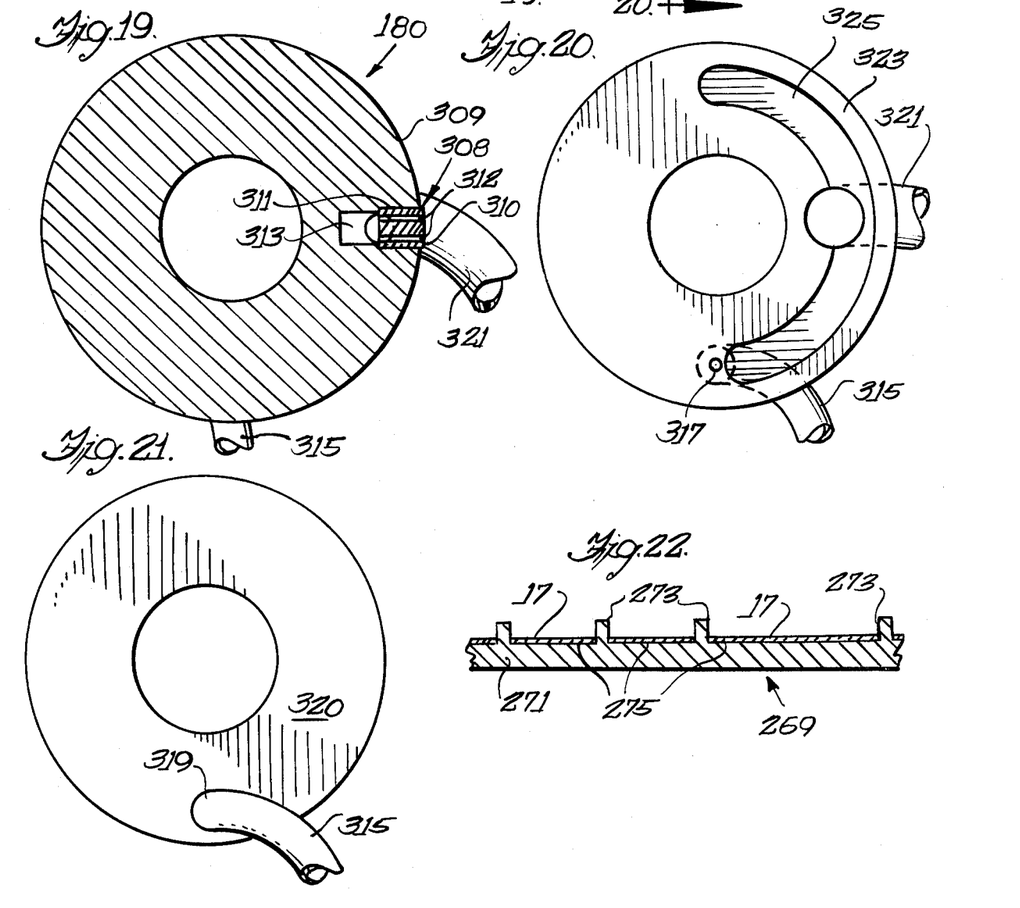
FIG. 19 is a view taken substantially along line 19—19 of FIG. 18.
FIG. 20 is a view taken substantially along line 20—20 of FIG. 18.
FIG. 21 is a view of a positive air pressure control disk.
FIG. 22 is an enlarged sectional view of a guide bar means for the webs of swatch material.

The individual webs 17a–17i are preferably guided to maintain their parallelism and to form rectangularly shaped swatches by a side edge guide means 269 (FIGS. 9 and 22) herein in the form of a horizontally extending bar 271 having grooves therein to define side edge guide walls 273 and a bottom guide wall 275 for engaging each of the respective ribbons 17, as best seen in FIGS. 9 and 22. Herein, the side edge guide means bar 271 is fastened at its opposite ends to the upstanding side frame plates 188. Manifestly, the side edge guide means have other forms with adjustable side walls.

Figure 8:
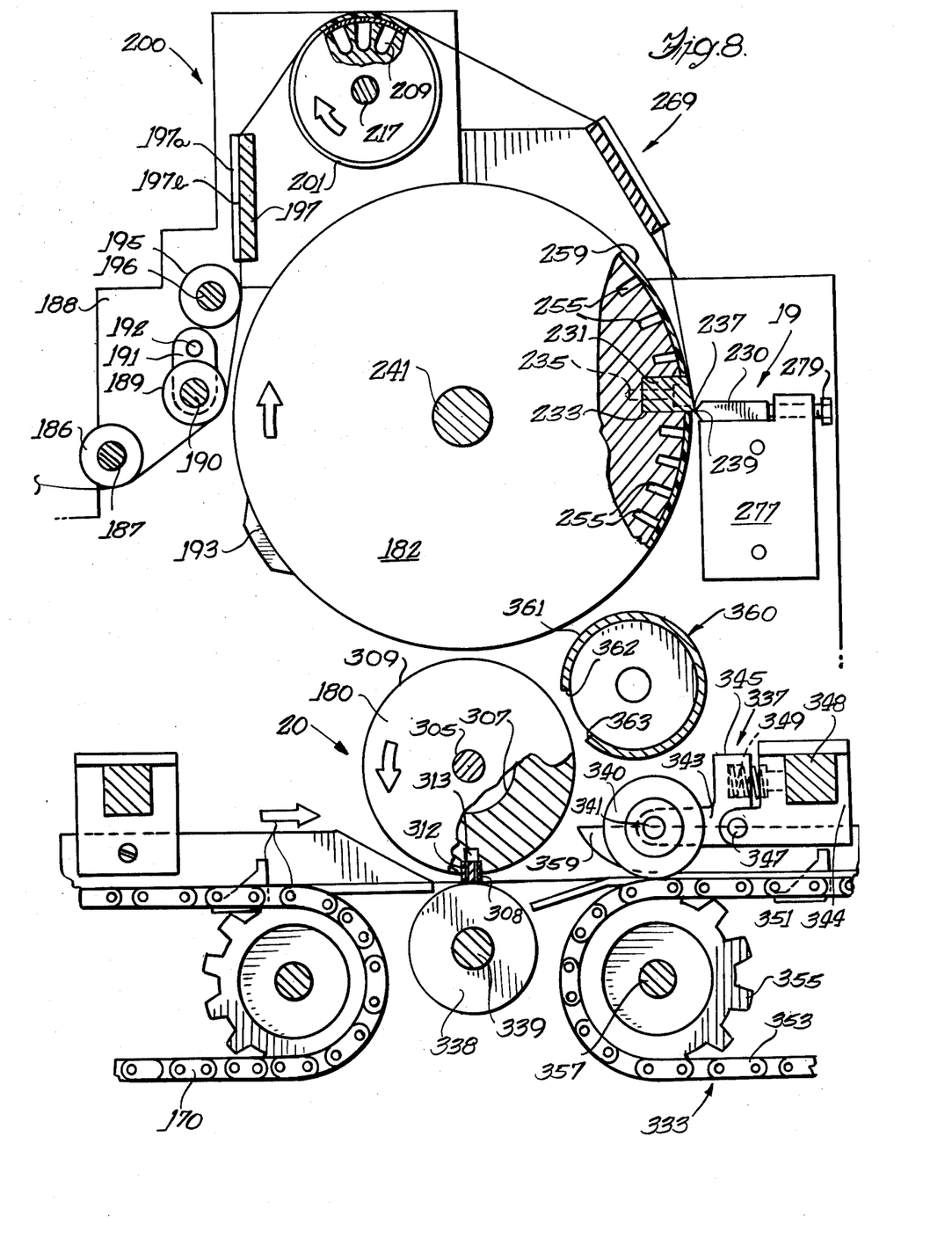
FIG. 8 is a fragmentary and partially sectional view of a swatch forming and applying apparatus constructed in accordance with another embodiment of the invention.

The illustrated stationary anvil knife 230 preferably comprises, as best seen in FIGS. 8 and 9, the stationary blade 230 supported on its underside by an elongated heavy bar 277 extending between the side frames 188. A plurality of adjusting screws 279 threaded in the bar 277 allows close control of the spacing between cutting edges of the blades and parallelism of the cutting edges by either a push or pull shifting of the anvil blade along the top of the bar 277.

The swatches 12 are carried downwardly from the severing means 19 towards the underlying transfer drum means being held by the suction pressure until the swatches 12 reach the nip formed at the underlying transfer drum 180 at which time it is preferred to assist the transfer by means of a positive pressure or blowout being applied over a positive pressure line 290 to a positive pressure valve means 291 located at the opposite or left side of the drum 182, as viewed in FIGS. 9 and 10. The valve means 291 comprises a fixed or stationary valve disk 293 (FIG. 15) secured to a side plate 188 and has a short arcuate groove 295 therein in fluid communication with port 297 of the positive pressure hose 290. A thin rotating valve disk 299 (FIGS. 10 and 14) is fastened to the left-hand wall of the drum 182, as viewed in FIGS. 9 and 10, and has therein several radially extending apertures 300 which when aligned with the groove 295 during rotation past the groove 295 admit positive air pressure into the aligned drum grooves 255 thus breaking the vacuum previously existing and causing air to flow through the slots 255 at bores 253 and pinholes 261 to provide a positive blowout pressure to cause the swatches 259 to transfer from the surface of the sheet 259 of the drum 182 and thereby transfer the swatches 12 to the transfer drum 180.

In a like manner, the transfer drum 180 retains the swatches thereon by a vacuum and carries the swatches downwardly to the underlying sheet 11 at which time a positive air pressure is exerted to assist in transferring the swatches to adhesive spots on the underlying sheet. Herein, the transfer drum 180 transfers swatches with each revolution thereof and has a single ported vacuum bar means on its periphery. The transfer drum 180 functions to place the unpainted side of the swatches against the adhesive spots, it being recalled that the painted sides of swatches previously faced outwardly of the severing drum surface. During the transfer operation at the nip between the drums, the painted sides of the swatches become oriented against the transfer drum's surface with their unpainted sides facing outwardly for moving into contact with the underlying sheet 11.

The transfer drum 180 is formed with a cylindrical wall portion 307, as best seen in FIGS. 8 and 19, carrying a longitudinally extending vacuum and pressure bar means in the form of an apertured bar 308 which extends longitudinally of the drum and projects outwardly of the drum surface 309 of the cylindrical wall portion 307 by a predetermined distance, e.g., about ⅛ inch, to its swatch engaging wall 310 so that the drum surface 309 will not contact the adhesive spots on the underlying sheets 11 passing beneath the transfer drum but will be spaced therefrom by about ⅛ of an inch. Herein, the apertured bar 308 is seated in a slot 311 machined into the cylindrical wall and is secured thereto by suitable fasteners. Preferably, the bar is about ½ inch in width and has two rows of generally radially directed apertures 312 therein with adjacent apertures in a row being spaced by about 3/16 of an inch. Each of the apertures 312 is in fluid communication with another narrow slot 313 located behind the bar and extending longitudinally the length of the bar to an air valve means 322 located at the right side of the transfer drum 180 as viewed in FIG. 18. Thus, negative air pressure from the air valve means 322 draws air through the apertures 312 and the narrow slot 313 and exerts a suction force on the swatches on the bar surface 310. A convenient manner of selectively masking those apertures 312 in each row which are not in alignment to receive a swatch is to cover them with a piece of masking tape so that negative as well as positive air pressure is communicated only through those holes which are unmasked. It is an easy matter to mask or unmask the apertures when one changes the widths or spacings of the swatches.

Herein, the drum is mounted for counterclockwise rotation, as viewed in FIG. 8, by a shaft 305 projecting outwardly of the end walls of the transfer drum 180 and journaled in the upstanding side frame plates 188. The swatches are carried downwardly to the underlying sheet and, at this time, the swatches are transferred again preferably by the aid of positive pressure through the air valve means 322. A positive air pressure pipe 315, FIGS. 18 and 20, is connected to a discharge port 317 for discharging a positive air pressure flow through an aperture 319 in a rotating valve disk 320 when the latter is at the bottom position, shown in FIG. 21.

Suction is applied to the transfer drum 180 through a suction hose 321 leading to the valve means 322 having a stationary valve disk 323 having an internal arcuate groove 325 in fluid communication with the suction hose 321. A rotating valve disk 326 has a slot therein aligned with the slot 313 and is secured to the rotating cylindrical wall 307 to travel past the vacuum groove 325 so that vacuum is applied through about 180° of downward turning of the transfer vacuum bar 308.

To maintain the proper timing of vacuum feed roller 201, the drum 182 with transfer drum 180, a gear drive is connected to the respective ends of the drive shafts for these drums, as best seen in FIG. 1. More specifically, the shaft 241 for the drum 182 has a driving gear 330 meshed with a gear 331 carried on a shaft 333 and carrying a small gear 335 meshed with and driving large mesh gear 337 fixed to the vacuum feed roller shaft 217 thereby turning with vacuum feed roller in timed relationship to the drum 182.

Preferably, a backup rotating roller 338 (FIG. 8) is mounted in the side frame means 57 by means of a rotatable shaft 339 to form a nip with the transfer roller 180 to force the swatches into sufficiently tight engagement with the sheet 11 that they will remain adhered thereto as the sheet will transfer into the next or third conveyor means 333 relating to another swatch forming applying station 18a which is substantially identical to the swatch forming and adhering station 118 described hereinabove. Depending on the size of the color card, approximately six to ten swatch forming stations 18, 18a–18i are provided, each of which applies a row of swatches to one of the respective rows 120a–120g of adhesive spots on the sheet.

It is preferred to provide a scrap collecting hollow sleeve 360 (FIG. 8) closely adjacent the surface of the transfer roller 180 and to remove any scraps or other material which tends to accumulate on the transfer drum. Herein, the sleeve 360 is secured to opposite stationary side frame walls 188 and has an arcuate opening in its circumferential wall 361 defined by edges 362 and 363 through which scrap may pass to the interior end of the sleeve 360.

To assure continuous movement and traveling of each sheet 11 between each of adjacent stations, several rotating upper pressure wheels 340, of the type shown in FIG. 8, are secured to a rotatable shaft 341. The latter is carried on horizontally extending arms 343 of a bellcrank lever 345 pivoted at its center portion by a pin 347 to a bracket 344. The bellcrank is pivoted by a coil spring 349 to engage the feed wheels 340 with the sheet 11, the tires having a thin width to engage the sheet 11 between adjacent rows of swatches and to form a feeding nips with another pressure (not shown) which is disposed beneath the wheels 340. Thus, the sheets 11 are pulled from the succeeding swatch applying station and fed forwardly for abutting engagement by conveyor fingers 351 carried on conveyor chains 353 turning about a sprocket 355 fastened to a shaft 357. Side edge guides 359 guide the card to maintain its parallelism to the next swatch forming inclined stations 18a. These feed wheel brackets 344 are slidably mounted on a horizontally disposed support shaft 348 allowing the wheels 340 to be shifted to locations so as not to engage and smear any adhesive on the sheet passing therebeneath.

To aid and understand, a brief description of the invention will be given. A plurality of blank sheets or cards 11 are positioned in the hopper tray 33 and the rotating vacuum pick-off roller 39 turns, as shown in FIGS. 2 and 3, to bring a suction port 41 into engagement with the upper side of the upper one of the stack of sheets 11 to begin to move it laterally into and through a nip to define with its lower underlying pressure roller 63. A pair of compressible resilient fingers 62 also engage the top surface of the sheet and push it forwardly whereupon the first conveyor means 25 brings feed fingers 86 upwardly to abut the trailing edge 11a of the sheet to push and convey the sheet forwardly to the adhesive station 23.

At the adhesive station 23, the rows 120a, 120b, etc., of spaced pads 113 move upwardly into engagement with the bottom of an applicator roller 115 to be coated with glue. The surface on the adhesive applicator roller 15 is wetted with adhesive film transferred from the adhesive pickup roller 125 having its lower periphery within the adhesive 126 and adhesive tray 122. A metering roller 129 abuts the surface applicator to control the amount of adhesive to the pads 113. The pads 113 on the continuously rotating adhesive applicator 110 travels downwardly to define a nip on the underlying pressure roller 105 to apply adhesive spots to the sheet traveling through the nip to the second conveyor means 27. If a sheet is not present, a photocell means 101 will detect the absence of the sheet and operates the solenoid 103 to shift the pressure roller 105 downwardly so that it will be spaced beneath the adhesive on the pads 113.

From the adhesive applying station 23, each sheet 11 is continuously moved forwardly by a second conveyor means 27 to receive a first row of swatches at the first of a series of swatch forming and applying stations 18, 18a–18i, each of which applies one set or row of swatches to the sheet 11 at the location of the spots of adhesive on the sheet.

Figures 14, 15, 16, 17:
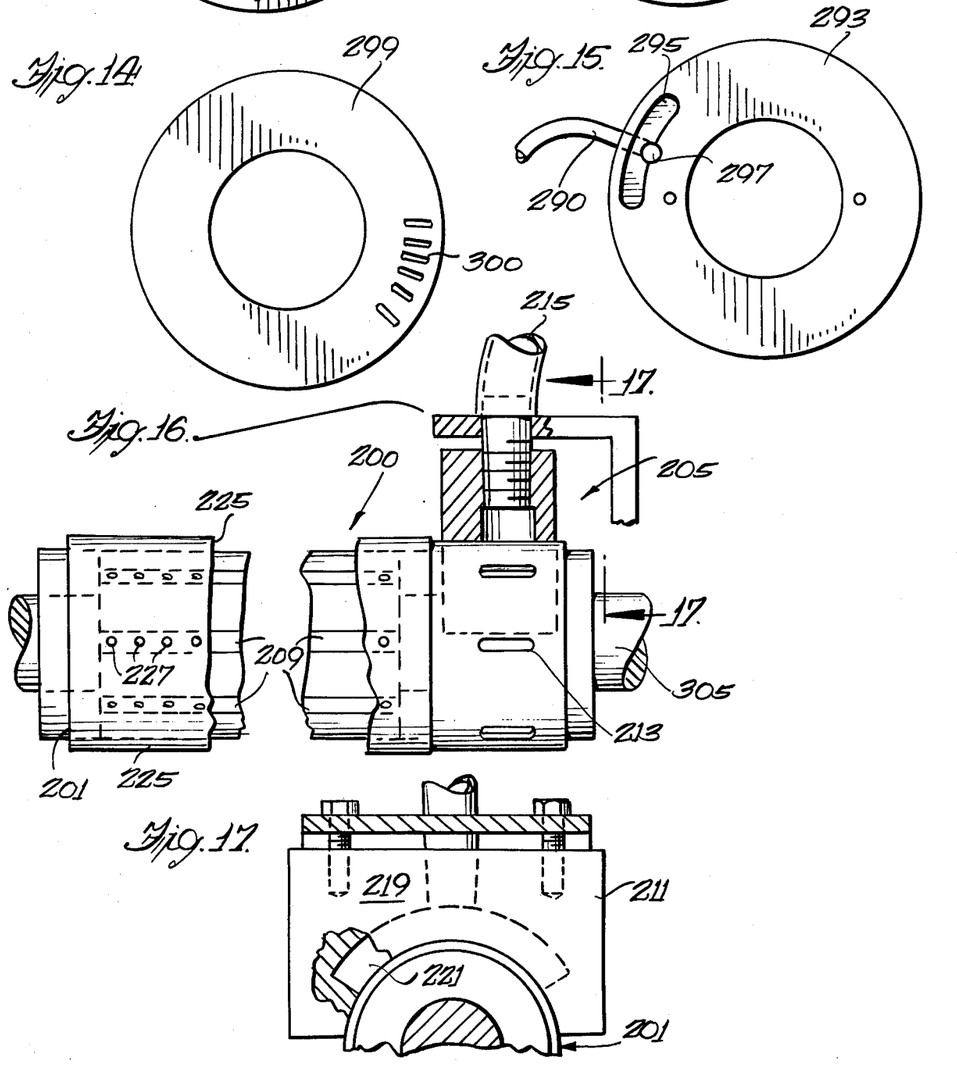
FIG. 14 is a view taken substantially along line 14—14 of FIG. 10.
FIG. 15 is a view taken substantially along line 15—15 of FIG. 10.
FIG. 16 is a partially sectioned view of a vacuum feed drum for the webs of swatch material.
FIG. 17 is a view taken substantially along line 17—17 of FIG. 16.

In accordance with an important aspect of the invention, a plurality of reels 16a–16i carrying endless webs 17a–17i are mounted at the transverse spacing desired for the swatches. As best seen in FIG. 8, each of the webs extends from its reel beneath rollers 186, 189 and across roller 195 to guide bar 197 to the vacuum feed means 200 which includes a driven rotatable vacuum feed roller means 201. A suction of negative pressure is applied to the suction roller 201 by means of a suction pipe 215 connected to a manifold 211 which covers the upper portion of the roller 201 and in communication with uncovered apertures 213 of the drum as the uncovered apertures 213 pass into the manifold 211 and into registry with the vacuum duct 221 (FIG. 17). The vacuum from the manifold and apertures 213 is communicated through longitudinally extending grooves or tails 209 in the vacuum feed roller 201. A series of apertures 227 in sheet 225 admits the negative pressure to the webs 17a–17i which are then pulled forwardly for dispensing from the respective reels 16. The sheet 225 is removable and may be replaced with a sheet having different configurations and/or spacings or hollows depending upon the transverse spacing of swatches on the sheet 11.

The webs 17a–17i are guided by a guide bar means 269, in FIGS. 9 and 22, to travel past the first anvil cutting blade 230 so that when the rotating cutting blade 231 on the drums 182 reaches a position shown in FIG. 8, each of the ribbons is severed to form a row or set of swatches which will remain adhered to the drum 182 for another 90° of travel at which the valve means 245 is operated to cause a positive air flow to transfer the swatches from the severing drum 182 to the transfer drum 180. The swatch transfer drum 180 is likewise a vacuum drum controlled by a vacuum valve means 322 which applies suction pressure to the swatches to hold the same as they travel downwardly in a clockwise direction, as viewed in FIG. 8, to the sheet 11 at which time positive air pressure assists in transfer of the swatches to the adhesive spots on the sheet 11. Then the card is transferred to a third conveyor means 337 which then shifts the sheet through the second swatch forming adhering station 18A at which the second set or row of swatches is applied to the sheet 11. Then a succeeding number of downstream stations will be continuously moving the card as rows of swatches are applied at each downstream station 18B, 18C, etc., until a desired number of swatches have been applied to the card. After feeding through the last of the swatch applying stations, the swatch bearing sheets are passed through the nip of a pair of presser rollers, one of which is spring biased, to assure that the swatches are fimly pressed against and adhered to the sheets. A scraper knife engages the upper presser roller to remove any adhesive thereon.

The correlated timing of the operations of the various mechanisms at the various stations can be best understood by viewing FIGS. 1 and 23 wherein the principal drives and timing chains are shown. The power is from electric motor 153 having a drive gear turning a drive chain 152 leading to the main gear and sprocket mechanism 153 which drives each of the sheet feeding, adhesive applying, and swatch forming and applying stations. The sprocket mechanism comprises a large main gear 370 driven by the chain 152 and fixed to the shaft 371 to which is affixed three other gears for driving in timed relationship chain 372 leading to the swatch forming and applying station 18, chain 373 leading to the adhesive applying station 23 and chain 374 leading towards the sheet feeding station. The chain 374 extends toward the sheet feeding station and drives a gear fixed to a horizontally disposed shaft 375 to which is fixed a gear 376 driving an upwardly inclined chain 377 for driving the support shaft 65 for friction pressure roller 66 and the sprockets 89 (FIG. 3) of the first conveyor chains 85. Another gear 377A fixed to the shaft 365 drives gear 378 fixed to the shaft 53 of the vacuum pick-up roller 39.

The chain 373 leading to the adhesive applying station 23 drives a gear 379 fixed to a shaft 379a to which is also affixed a gear 380 which is meshed, and driving engagement with a gear 381 which drives a cross shaft 381a extending to the opposite side plate to drive a gear 381b meshed with gear 141 fixed to the adhesive applying drum shaft 143.

The chain 372 for driving the swatch forming and applying station 18 is entrained about a gear 382 affixed to a shaft 383 which has a gear affixed thereto for driving a gear 385 fixed to the shaft 305 for driving gear 386 which is fixed to the shaft 241 of the transfer drum 180.

The precise positioning of the swatches on the sheets 11 and relative to the pusher conveyor fingers 86 and 169 is achieved and maintained by providing means which allows rotational adjusting movement of the adhesive applying drum 110, the severing drum 182 and the transfer drum 180. The adhesive applying drum and the transfer drum are each provided with a worm screw adjustment means 391 which includes a worm screw 393 that is turned to turn the drum's supporting shaft relative to the gear train and preferably a dial means 394 is provided thereon to aid in indicating the amount of angular adjusting of the drum. More specifically, as best seen in FIG. 24, the shifting of the transfer drum shaft 305 and the transfer drum 182 secured thereto is accomplished by turning the worm screw 393 carried by an outer cylindrical mount 396 secured by fasteners 397 to driving gear 395 which will be held stationary by the gear drive when the worm screw 393 is turned. An inner worm gear 397 is keyed by a key 398 to the shaft 305 to be secured to rotate the shaft 305 with the turning of the worm gear 397 by the worm screw 393. The worm gear 397 has on its outer radial face a dial 399 with gradations showing each 0.196 of turning movement. The gear 395 and worm screw mount 396 are both mounted on the shaft 305 with a slipping fit therewith. Thus, the drive from the gear 395 goes through the mount 396, the worm screw 393, the worm gear 397, the key 398 to the shaft 305. The severing drum has an outer mount 400 which can be adjusted circumferentially when a screw 401 is loosened to adjust the position of the drum 182 and its rotating severing blade.

Also, the respective conveyor chains 85 and 170 are provided with manual cranks 395 which may be selectively clutched to the respective support shafts for these conveyor chains 85, 170, 353, etc., to allow hand adjustment and movement thereof relative to the respective devices at the sheet feeding, adhesive applying, or swatch forming and applying stations 18, 18A–18E.

To change the length of the swatches, the speed of the vacuum feed roller 201 may also be changed by removing the gears 337 and 335, FIG. 1, and replacing them with another set of gears provide a different gear ratio between the severing drum 182 and vacuum feed roller 201. To lengthen the swatches, one provides a faster speed of rotation for the vacuum feed roller allowing a greater length of web to be fed along the drum 182 before the severing blade on the drum 182 severs the web to form the swatches. Thus, the length of swatches also may be varied.

From the foregoing, it will be seen that the present invention provides a very high speed operation in which the sheets are fed continuously and automatically through the glue or adhesive applying station 23 and then through several swatch forming and transferring stations each of which transfer a row of swatches to the card. The preferred swatches are not precut to size as with the conventional till box, but are severed from continuous webs or ribbons 17a–17i, each of a particular color. The apparatus operates continuously and at a high rate of speed with few manual operations.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of manufacture of swatch bearing sheets each bearing rows of swatches adhered to the sheet at predetermined locations thereon, said method comprising the steps of: feeding a succession of sheets along a predetermined straight path at timed intervals, feeding a first set of webs of swatch material to a first swatch forming and applying station, simultaneously severing individual swatches from the webs to form a first set of swatches, transferring simultaneously the first set of swatches to the sheet by rolling contact a set of swatches from an in-line intersecting path to said straight path, and adhering a plurality of swatches formed from said first set of webs to each sheet traveling through the first swatch forming and applying station at first predetermined locations on each sheet, feeding each of the sheets from said first station along said straight path to a second swatch forming and applying station located downstream of said first station and in-line with said first station, simultaneously severing a second set of swatch material webs at said second station to form a second set of swatches, and tranferring simultaneously the second set of swatches to the sheet by rolling contact the second set of swatches from an in-line an intersecting path with said straigth path, and adhering by rolling contact a second set of swatches severed from the second sheet of webs of swatch material to each sheet passing along said path and through said second station to provide the sheet with plural rows of swatches attached thereto at predetermined locations on the sheet.

2. A method of manufacture of swatch bearing sheets having rows of swatches thereon at predetermined locations on the sheet, said method comprising the steps of: continuously feeding a succession of sheets for continuous travel along a predetermined path through a plurality of swatch applying stations, applying a first row of swatches to each continuously moving sheet by rolling contact therewith at a first one of said stations, continuously feeding each of said sheets to at least a second swatch applying station, and applying a second row of swatches to each continuously moving sheet by rolling contact therewith while said sheet travels through said second station to form a plurality of rows of swatches on said sheets.

3. A method in accordance with claim 2 including the further step of applying adhesive to each of the spaced swatch receiving locations on the sheets by a single rolling adhesive means as each of the sheets travels continuously and uninterruptedly through an adhesive applying station.

4. A method of manufacture of swatch bearing sheets each having a plurality of rows of swatches thereon at predetermined locations, said method comprising the steps of: feeding a succession of sheets forwardly along a predetermined path to an adhesive application station, applying adhesive to each of said sheets at the adhesive applying station by a rolling contact adhesive applicator at the adhesive station in a plurality of successive rows of adhesive spots, feeding a plurality of webs of swatch material forwardly to a severing means at each of a plurality of swatch forming stations, severing the webs to form sets of swatches of predetermined lengths at each of the swatch forming stations, and transferring by rolling contact a row of swatches at each of the swatch forming stations by a rolling transfer means to each sheet as it passes through each of the several swatch forming stations.

5. An apparatus for manufacturing swatch bearing sheets each bearing rows of swatches adhered to the sheet at predetermined locations thereon, said apparatus comprising: means for feeding a succession of sheets along a predetermined straight path at timed intervals, means for feeding a first set of webs of swatch material to a severing station, means for severing individual swatches from the webs, means for transferring to said sheet by rolling contact a set of swatches moving along a path intersecting said straight path and for applying said severed swatches from said first set of webs to each sheet, means for feeding each sheet along said straight path to a second downstream swatch forming and applying station, means for feeding a second set of webs of swatch material at said second station, means for severing swatches from the second sheet of webs of swatch material, and means for transferring by rolling contact the second set of swatches from an in-line and intersecting path with said straight path and for applying a second set of swatches to each sheet to provide plural rows of swatches at predetermined positions on each of the sheets.

6. An apparatus for manufacturing swatch bearing sheets having rows of swatches thereon at predetermined locations on the sheet, said apparatus comprising: means for continuously feeding each of said sheets for continuous travel through a plurality of swatch applying stations, means for applying a first set of swatches to each of the continuously moving sheets by rolling contact therewith at a first swatch applying station, means for continuously feeding each of said sheets to a second swatch applying station, and means for applying a second set of swatches to each of said sheets by rolling contact with each of the sheets.

7. An apparatus for manufacturing swatch bearing sheets each having a plurality of rows of swatches thereon at predetermined locations, said apparatus comprising: means for feeding a succession of sheets forwardly along a predetermined path to an adhesive applying station, rolling adhesive means for applying adhesive to each of the swatch receiving locations on each sheet by a rolling contact at the adhesive station in a plurality of successive rows of adhesive spots, means for feeding a first set of webs of swatch material forwardly to a severing station at a first swatch forming station, means for severing the first set of webs to form swatches at predetermined lengths at the first swatch forming station, rolling applicator means for applying the swatches formed at the first swatch forming station by rolling contact to each of the sheets passing through the first swatch forming and applying station, means for feeding each sheet to a second swatch forming and applying station, means for feeding a second set of webs of swatch material to a second severing station, severing means at the second severing station for severing the second set of webs to form swatches of predetermined length, and means for applying by rolling contact the second swatches to each of the sheets.

8. An apparatus for the manufacture of swatch bearing sheets having rows of swatches adhered thereto at predetermined locations on the sheets, said apparatus comprising: means for feeding a succession of sheets through a series of swatch forming and applying stations located along a predetermined path of travel for the sheets, means for severing a plurality of webs of swatch material to form individual swatches at each of the swatch forming and applying stations, rotating vacuum drum means at each of said swatch forming and applying stations for holding the webs at a predetermined spaced relationship while the webs are being severed to form swatches and for holding and maintaining the swatches in said predetermined spaced relationship until the swatches are transferred and adhered to a sheet.

9. An apparatus in accordance with claim 8 in which an adhesive drum means applies adhesive by rolling contact to each of the succession of sheets and in which a replaceable sheet means is provided on said drum means having a plurality of adhesive bearing pads thereon, said replaceable sheet means being replaceable to allow its replacement by another sheet having different pads thereon to apply adhesive to different swatch receiving locations on the sheets.

10. An apparatus in accordance with claim 9 in which said transfer drum means is provided with a replaceable sheet, said replaceable sheet having apertures therein located in accordance with the transverse spacing of said swatches within the row of swatches, said replaceable sheet being removable to allow installation of other sheets having apertures at different spacings to accommodate different swatch locations.

11. An apparatus for manufacturing swatch bearing sheets each having a plurality of rolls of swatches thereon at predetermined locations, said apparatus comprising: means for holding a stack of sheets, means for removing an individual sheet from the stack at predetermined time intervals a first conveyor means for continuously forwarding each of the sheets provided thereto at said timed intervals to an adhesive applying station, adhesive applying means including a rotatable adhesive applying drum means at said adhesive applying station for applying spots of adhesive to each of the sheets as it travels uninterrupted through said adhesive applying station, and a plurality of swatch forming and applying stations comprising means for holding a plurality of reels of different colored webs of swatch material, a vacuum feed means for feeding predetermined lengths of the webs of swatch material in timed relationship to the movement of said sheets by said conveyor means, means for severing each of said webs to form individual swatches, vacuum drum means for holding said severed swatches in a row and at predetermined transversely spaced positions relative to one another, a vacuum transfer drum means for maintaining a row of swatches in their predetermined positions and for moving the swatches into engagement with a predetermined row of adhesive spots on each sheet.

12. An apparatus in accordance with claim 11 in which said means for removing the sheets from the stack comprises a rotatable vacuum pick-off roller and a vacuum control valve for controlling the application of vacuum to said pick-off roller to pull a sheet from the stack.

13. An apparatus in accordance with claim 11 in which a sensing means senses the absence of a sheet on said conveyor means, and in which a disabling means disables said adhesive applying means in the absence of a sheet.

14. An apparatus in accordance with claim 13 in which a pressure roller is disposed to form a nip with said rotatable adhesive drum means and in which said disabling means shifts said pressure roller out of the path of the adhesive drum means to prevent the application of adhesive thereto when a sheet is absent.

15. An apparatus in accordance with claim 11 in which said rotatable adhesive drum means comprises a rotatable drum having a replaceable sheet thereon, a plurality of outwardly projecting pads on said sheet for contact with the swatch receiving sheet to apply the spots of adhesive to the latter, and an adhesive roll applicator means for applying a coating of adhesive to the pads during the rotation of said drum means.

16. An apparatus in accordance with claim 11 in which said vacuum feed means for feeding said webs of swatch material comprises a rotatable vacuum roller using an internal vacuum to grip the webs thereto and to pull the webs from their respective reels with rotation of said vacuum roller and a valve means for selectively applying the suction pressure for a predetermined arcuate extent of the rotation of the vacuum feed roller means.

17. An apparatus in accordance with claim 16 in which said vacuum feed roller means comprises a rotatable vacuum drum means, said drum means having a replaceable sheet thereon having apertures aligned with each of the webs for applying a gripping vacuum to cause the webs to be attached thereto and to travel therewith, and an air valve means for controlling the selective application of vacuum to the drum means for a predetermined extent of the travel of said drum means.

18. An apparatus for manufacturing swatch bearing sheets each bearing rows of swatches adhered to the sheet at predetermined locations thereon, said apparatus comprising: means for feeding a succession of sheets along a predetermined path at timed intervals, rotatable adhesive drum means for applying spots of adhesive to each of the sheets at locations to receive a swatch, means for feeding a first set of webs of swatch material to a severing station, rotatable drum means for severing individual swatches from the webs, rotatable drum means for applying said severed swatches from said first set of webs to a row of adhesive spots on each sheet, means for feeding each sheet to a second swatch forming and applying station, means for feeding a second set of webs of swatch material at said second station, rotatable drum means for severing swatches from the second sheet of webs of swatch material, rotatable drum means for applying a second set of swatches to adhesive spots on each sheet to provide plural rows of swatches at predetermined positions on each of the sheets, and adjusting means for said drum means to shift the drums incrementally in a circumferential direction to provide registering of said adhesive spots and the swatches at the respective stations.

* * * * *